United States Patent [19]

Blanken

[11] Patent Number: 4,929,912
[45] Date of Patent: May 29, 1990

[54] CURRENT MIRROR CIRCUIT, AND VIDEO OUTPUT AMPLIFIER CIRCUIT PROVIDED WITH THE CURRENT MIRROR CIRCUIT

[75] Inventor: Pieter G. Blanken, Eindhoven, Netherlands

[73] Assignee: U.S. Philips Corporation, New York, N.Y.

[21] Appl. No.: 280,103

[22] Filed: Dec. 1, 1988

[30] Foreign Application Priority Data

Dec. 10, 1987 [NL] Netherlands .......................... 8702980

[51] Int. Cl.$^5$ ............................................. H03F 3/16
[52] U.S. Cl. ........................................ 330/288; 330/277
[58] Field of Search ............... 330/253, 255, 257, 277, 330/288, 300; 307/544, 548; 358/184

[56] References Cited

U.S. PATENT DOCUMENTS

| | | | |
|---|---|---|---|
| 4,331,981 | 5/1982 | Parker | 358/243 |
| 4,340,904 | 7/1982 | Wingrove, Jr. | 358/29 |
| 4,471,292 | 9/1984 | Schenk et al. | 330/288 X |
| 4,679,092 | 7/1987 | Blanken et al. | 358/242 |
| 4,701,643 | 10/1987 | Laude et al. | 307/544 X |

FOREIGN PATENT DOCUMENTS 0196694 10/1986 European Pat. Off. .
2084839 4/1982 United Kingdom .

*Primary Examiner*—Steven Mottola
*Attorney, Agent, or Firm*—Edward W. Goodman

[57] ABSTRACT

In a current mirror circuit (19) provided with a current mirror (29), an input (31) and an output (33) of which are coupled to an input (1) and an output (2), respectively, of the current mirror circuit (19), and a limiter circuit which having a reference current source (37) and a unilaterally conducting element (D1) having a transistor (T4), a source electrode of which is coupled to the input (1) of the current mirror circuit (19), a control electrode of this transistor (T4) is coupled to the reference current source (37), to a further output (35) of the current mirror (29) and to a reference voltage terminal (41) via a further unilaterally conducting element (D2), and a drain electrode of the transistor is coupled to a power supply terminal so that exclusively high-ohmic elements are connected to the further output (35) of the current mirror (29) at the instant when a current (I3) related to an input current (I1) of the current mirror (29) and flowing through the further output (35) of the current mirror (29) becomes equal to a reference current ($I_{ref}$) supplied by the reference current source (37), at which instant of transition the input current (I1) of the current mirror (29) thus reaches its permitted maximum value ($I'_{ref}$), so that, if the current (I3) through the further output 35 of the current mirror (29) further increases, the control electrode potential of the transistor (T4) will increase considerably, resulting in the transistor (T4) changing over rapidly to the conducting state.

12 Claims, 2 Drawing Sheets

CURRENT MIRROR CIRCUIT, AND VIDEO OUTPUT AMPLIFIER CIRCUIT PROVIDED WITH THE CURRENT MIRROR CIRCUIT

BACKGROUND OF THE INVENTION

1. Field of the Invention

The invention relates to a current mirror circuit being provided with a current mirror, an input and an output of which are coupled to an input and an output, respectively, of the current mirror circuit, and a limiter circuit comprising a reference current source and a unilaterally conducting element which includes a transistor, an emitter or source electrode of which is coupled to the input of the current mirror circuit.

The invention also relates to a video output amplifier circuit provided with the current mirror circuit.

2. Description of the Related Art

A current mirror circuit and a video output amplifier circuit of the type described above are known from European Patent Application EP-A No. 0.196.694 (PHN 11.504). To limit the dissipation in this circuit, the output current of the current mirror circuit is limited by connecting its input to a negative feedback input of a differential amplifier, an output of which is connected to said negative feedback input via the unilaterally conducting element. The other input of the differential amplifier is connected to a reference voltage which is generated by passing a reference current supplied by the reference current source through an impedance which is similar to an input impedance of the current mirror. In the case of a too large current, the differential amplifier and the unilaterally conducting element, which may be both a diode and a base-emitter junction (or gate-source junction) of a transistor in the known circuit, then constitute a negative feedback signal path which maintains the output current constant at a maximum valve which is determined by the reference current.

Although the output current is limited at this maximum value, an unwanted power dissipation is still found to appear in the case of given signal waveforms.

SUMMARY OF THE INVENTION

It is an object of the invention to provide a current mirror circuit and a video output amplifier circuit in which this unwanted power dissipation is reduced.

According to the invention, a current mirror circuit of the type described in the opening paragraph is therefore characterized in that a control electrode of the transistor is coupled to the reference current source, to a further output of the current mirror and to a reference voltage terminal via a further unilaterally conducting element, and in that a collector or drain electrode of the transistor is coupled to a power supply terminal.

The invention is based on the recognition that exclusively high-ohmic elements are connected to the further output of the current mirror at the instant when a current related to an input current of the current mirror and flowing through the further output of the current mirror becomes equal to the reference current, at which instant of transition the input current of the current mirror thus reaches its permitted maximum value. The result of this is that, if the input current through the input of the current mirror circuit still further increases, the control electrode potential of the transistor will increase considerably as soon as the current through the further output of the current mirror even exceeds the reference current by a fraction so that the unilaterally conducting element will change very rapidly to the conducting state.

The result of this is that a period required to cause the output current of the current mirror circuit to reach its final value is considerably reduced, so that the magnitude of current peaks occurring in the case of some signal waveforms is reduced whereby the unwanted power dissipation is reduced. Since the control electrode of the transistor in the first-mentioned unilaterally conducting element is coupled to the reference voltage terminal via the further unilaterally conducting element, the control electrode potential of this transistor will not be too low so that the period required to cause the transistor to change over to the conducting state does not become too long, and as a result of this, the period required to cause the output current through the first-mentioned output of the current mirror circuit to reach its final value remains short. In fact, if the control electrode potential in the non-conducting state is (far) below the source electrode potential, the period required to cause this transistor to be turned on is influenced unfavorably.

It is to be noted that it is known per se from FIG. 8 of European Patent Application EP-A No. 0,116,982 (PHN 10.546) to use a limiter circuit in an amplifier arrangement having a first and a second amplifier stage, while a control electrode of a transistor T16 is coupled to a reference current source $I_R$ and to a reference voltage terminal $V_R$ via a further unilaterally conducting element T17, and a collector of the transistor T16 is coupled to a power supply terminal so that the transistor T16 is turned off if a current supplied by a transistor T15 is smaller than a maximum value determined by the reference current source and is turned on if this current exceeds this maximum value, but the emitter of the transistor T16 acts on an input of the second amplifier stage, while no use is being made of a current mirror with a further output for supplying the current to be compared with the reference current and not only elements which are exclusively high-ohmic are connected to the collector of the transistor T15 particularly because an RC network with a resistor 15 and a capacitor 16 is used at the instant of transition when the current supplied by the transistor T15 becomes equal to the reference current, so that the above-described effect of the circuit according to the invention does not occur.

If a transistor mentioned in the description or in the Claims is a bipolar transistor, the control electrode is its base. If a transistor is a unipolar transistor, the control electrode is its gate.

A first embodiment of a current mirror circuit according to the invention is characterized in that the current mirror comprises a first, a second and a third transistor whose emitter or source electrodes are coupled to each other, and whose control electrodes are coupled to each other, the control electrode of the first transistor being coupled to its collector or drain electrode and the reference voltage terminal being connected to the said emitter or source electrodes.

A second embodiment of a current mirror circuit according to the invention is characterized in that the current mirror comprises a first, a second and a third transistor whose emitter or source electrodes are coupled to each other and whose control electrodes are coupled to each other, the reference voltage terminal being coupled to the said control electrodes, a collector or drain electrode of the second transistor being coupled to the output of the current mirror via a further transistor and a collector or drain electrode of the third transistor being coupled to the further output of the current mirror, an emitter or source electrode of said further transistor being coupled to the collector or drain electrode of the second transistor and a collector or drain electrode being coupled to the output of the current mirror.

These two embodiments have the advantage that the required reference voltage is obtained in a simpler manner without any additional components.

BRIEF DESCRIPTION OF THE DRAWINGS

The invention will now be described in greater detail, by way of non-limiting example, with reference to the accompanying drawings, in which.

DESCRIPTION OF THE PREFERRED EMBODIMENT

Figure 1:
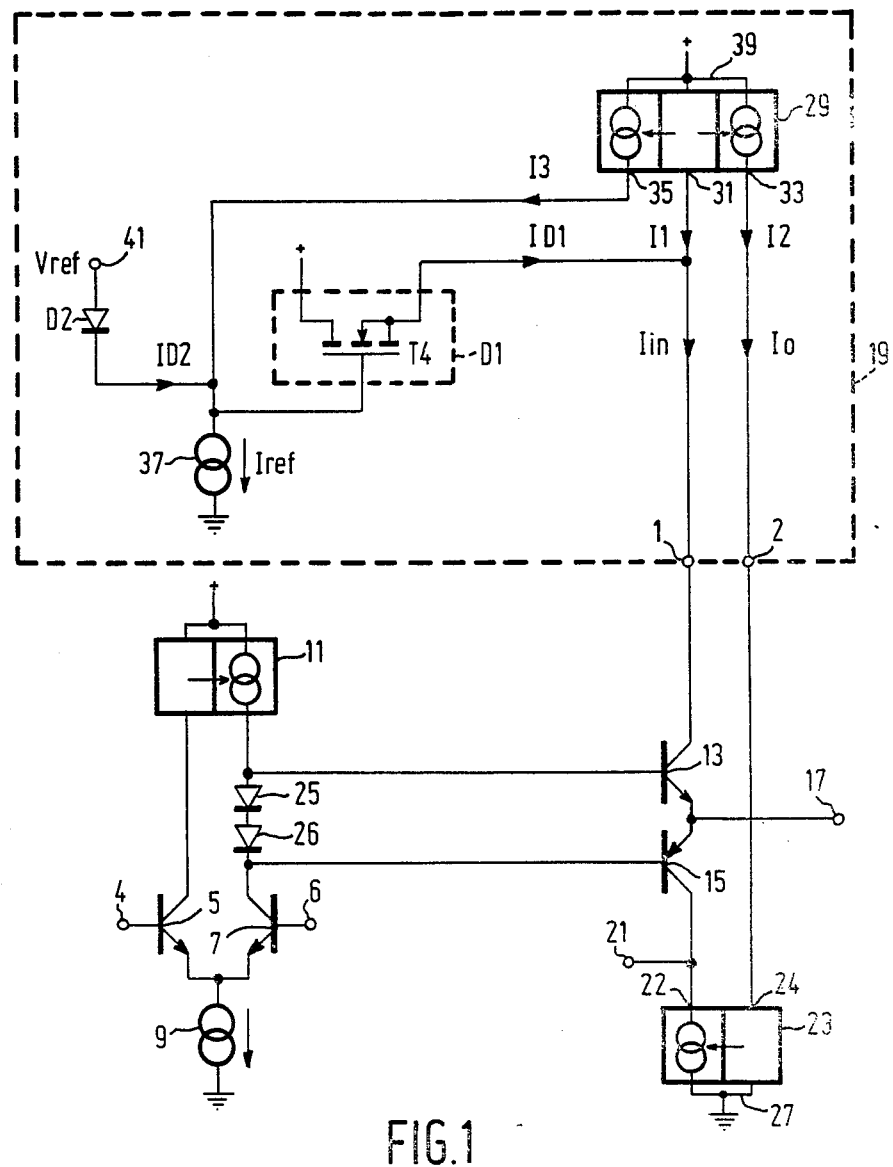
FIG. 1 shows a circuit diagram of a video output amplifier circuit according to the invention.

In FIG. 1 inputs 4, 6 of a video output amplifier circuit are connected to the bases of two transistors 5, 7 whose interconnected emitters are connected to ground via a current source 9. The collector of the transistor 5 is connected via a mirror 11 to the base of a transistor 13 which together with a transistor 15 constitutes a complementary emitter follower output stage. The interconnected emitters of these transistors 13, 15 are connected to an output 17 of the video output amplifier circuit. The base of the transistor 13 is connected via two diodes 25, 26 to the base of the transistor 15 and to the collector of the transistor 7. The collector of the transistor 13 is connected to an input 1 of a first current mirror circuit 19. The collector of the transistor 15 is connected to a beam current measuring point 21 and to an output 22 of a second current mirror circuit 23. An input 24 of this second current mirror circuit 23 is connected to an output 2 of the first current mirror circuit 19. A common terminal 27 of the second current mirror circuit 23 is connected to ground. Up to this point the video output amplifier circuit according to the invention corresponds to the known video output amplifier circuit; as has been described in the above-cited European Patent Application EP-A No. 0.169.694 (PHN 11.504), this circuit enables a quiescent current to flow through the output transistors, while the beam current measurement is not influenced by this quiescent current.

The first current mirror circuit 19 comprises a current mirror 29 and a limiter circuit including a unilaterally conducting element D1, a further unilaterally conducting element D2 and a reference current source 37. The current mirror 29 has an input 31 which is connected to the input 1 of the first current mirror circuit 19, an output 33 which is connected to the output 2 of the first current mirror circuit 19 and a further output 35 which is connected to ground via the reference current source 37 through which a reference current $I_{ref}$ flows. A common terminal 39 of the current mirror 29 is connected to a positive power supply voltage. The input 1 of the first current mirror circuit 19 is also connected to the source of a field effect transistor T4 constituting the unilaterally conducting element D1, whose drain is connected to the positive power supply terminal and whose gate is connected to the reference current source 37 and, via the further unilaterally conducting element D2, to a reference voltage terminal 41 to which a reference potential $V_{ref}$ is connected.

This first current mirror circuit 19 operates as follows. A current I1 through the input 31 of the current mirror 29 is mirrored by this current mirror 29 and results in a current I2 through the output 33 and a current I3 through the further output 35 of the current mirror 29. If the current I1 is so small that the current I3 is smaller than the reference current $I_{ref}$, the further unilaterally conducting element D2, which may be, for example a diode, will conduct. A current $I_{D2}$ supplied thereby is then equal to the difference $I_{ref}-I3$. A gate potential $V_g4$ of the transistor T4 is then equal to the reference potential $V_{ref}$ minus a voltage $V_{D2}$ across the further unilaterally conducting element D2. For a correct operation of the limiter circuit the reference potential $V_{ref}$ must be suitably chosen with respect to a value of an input potential $V_{31}$ at the input 31 of the current mirror 29, which potential occurs when the current I1 through this input 31 is equal to its maximum value $I'_{ref}$ which is dependent on the reference current $I_{ref}$. It will hereinafter be described in which way a suitable choice must be made. Since the input potential $V_{31}$ is equal to a source potential $V_s4$ of the transistor T4, a gate source voltage $V_{gs}4$ of the n-type field effect transistor T4 will be smaller than its threshold voltage $V_{TN}4$ in the case of a suitable choice of the reference potential $V_{ref}$ as long as the current I3 is smaller than the reference current $I_{ref}$, so that this transistor T4 will not be turned on. A current $I_{D1}$ supplied thereby is thus equal to 0, so that the current I1 is equal to an input current $I_{in}$ through the input 1 of the of the first current mirror circuit 19.

If the input current $I_{in}$ and hence the current I1 increase, the current I3 also increases until this current I3 has ultimately become equal to the reference current $I_{ref}$. In this transistional case of the further unilaterally conducting element D2 will be just conducting, while it holds that $V_{D2}$ increased to a value occurring when the current $I_{D2}$ is just not equal to 0. Since at this transitional moment only high-ohmic elements are connected to the further output 35 of the current mirror 29, if the input current $I_{in}$ through the input 1 of the first current mirror circuit 19 still further increases, the gate potential $V_g4$ of the transistor T4 will increase considerably as soon as the current I3 through the further output 35 of the current mirror 29 exceeds the references current $I_{ref}$ even by a fraction, so that the unilaterally conducting element D1 will change over to the conducting state very rapidly. Consequently the period required to cause the output current $I_o$ to reach its final value is very short and as a result no or at most very small current peaks can occur so that the unwanted power dissipation is very small. Since the current $I_{D1}$ supplied by the transistor T4 now fills up the shortage $I_{in}-I'_{ref}$, the current I1 through the input 31 of the current mirror 29 remains equal to its maximum value $I'_{ref}$. If the current mirror 29 comprises transistors having identical dimensions, this value $I'_{ref}$ is equal to $I_{ref}$ itself. Consequently the current I2 through the output 33 of the current mirror 29, and hence an output current $I_o$ through the output 2 of the first current mirror circuit 19 can neither exceed a value $I''_{ref}$ dependent on the reference current $I_{ref}$. If the current mirror 29 comprises transistors having identical dimensions, this value $I''_{ref}$ is is also equal to $I_{ref}$ itself.

The reference potential $V_{ref}$ is chosen suitably if, as stated hereinbefore, the transistor T4 is turned off as long as the current I1 is smaller than its maximum value $I'_{ref}$ dependent on the reference current $I_{ref}$, thus with $V_{gs}4$ being smaller than $V_{TN}4$. Since as soon as I1 becomes equal to $I'_{ref}$, the gate potential $V_g4$ of the transistor T4 increases very rapidly at this transitional moment, the reference potential $V_{ref}$ can also be chosen to be slightly lower, thus ensuring that, as long as the current I3 through the further output 35 of the current mirror 29 is not larger than the reference current $I_{ref}$, the gate-source voltage $V_{gs}4$ of the transistor T4 is smaller than its threshold voltage $V_{TN}4$ and the transistor T4 is consequently turned off. However, the lower the value chosen for the reference voltage $V_{ref}$, the time required to cause the trsnsistor T4 to be turned on will increase. Consequently, current peaks may be produced again, resulting in the unwanted power dissipation.

If the first current mirror circuit 19 comprises bipolar transistors, a suitable choice for the reference voltage $V_{ref}$ can be made in a comparable manner, while using the expressions relating to bipolar transistors.

Figure 2:
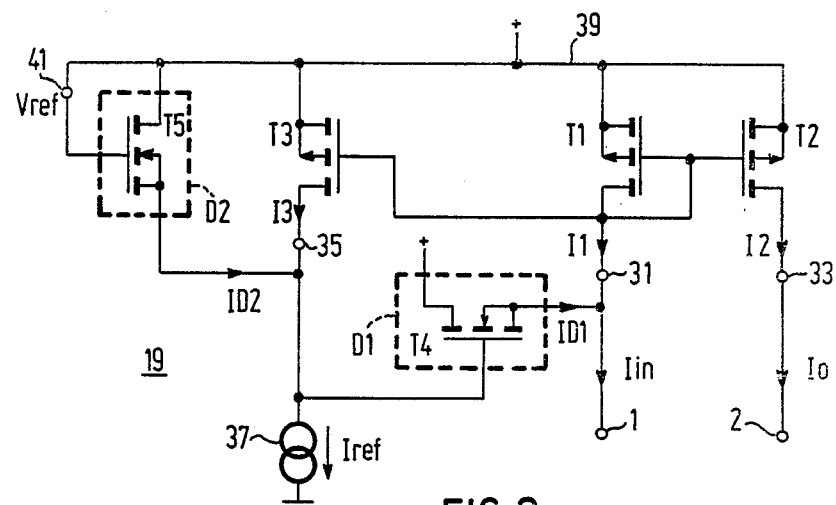
FIG. 2 shows a first detailed circuit diagram of a current mirror circuit according to the invention.

In FIG. 2 in which the same reference numerals have been used for components corresponding to those in FIG. 1, the current mirror 29 comprises three p-type field effect transistors T1, T2 and T3, the input 31 of the current mirror 29 being connected to the drain of the transistor T1 whose gates and sources are connected to the gates and sources of the transistors T2 and T3, respectively. The gate of the transistor T1 is connected to its drain so that this transistor T1 operates as an input transistor of the current mirror 29. The drain of the transistor T2 is connected to the output 33 of the current mirror 29. The further unilaterally conducting element D2 is constituted by a n-type field effect transistor T5 whose source is connected to the gate of the transistor T4, whose gate is connected to the reference voltage terminal 41 and whose drain is connected to the positive power supply terminal. The reference voltage terminal 41 is connected to the sources of the transistors T1, T2 and T3, which is found to provide a suitable choice for the reference potential $V_{ref}$ in the circuit shown in this Figure. The field effect transistor T5 may alternatively be of the p-type. In that case, the drain and the gate of the transistor T5 are interconnected and connected to the gate of the transistor T4, and the source of the transistor T5 is connected to the reference voltage terminal 41. Also in that case, this reference voltage terminal 41 is connected to the sources of the transistors T1, T2 and T3, which is found to provide a suitable choice for the reference potential $V_{ref}$.

Figure 3:
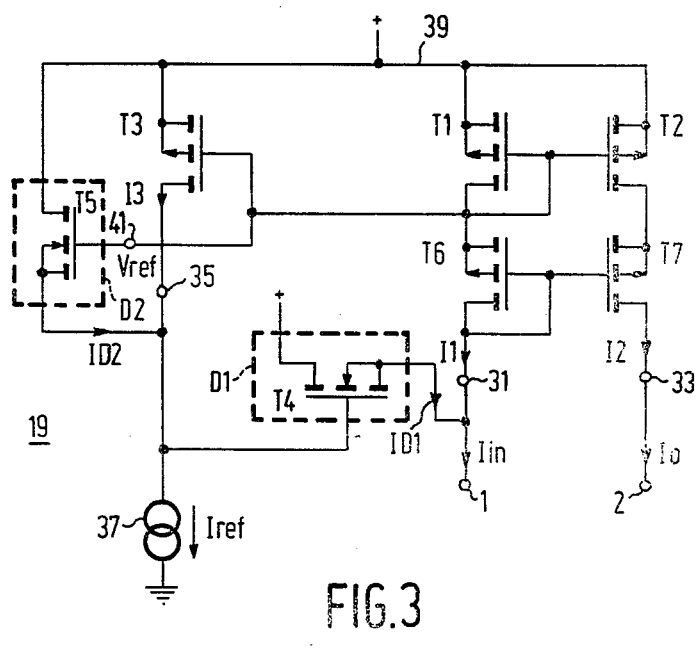
FIG. 3 shows a second detailed circuit diagram of a current mirror circuit according to the invention.

In the second detailed circuit diagram of the current mirror circuit 19 which is shown in FIG. 3, in which the same reference symbols have been used for components corresponding to those shown in FIGS. 1 and 2, according to the invention the reference voltage terminal 41 is connected to the gates of the transistors T1, T2 and T3, so that the reference potential $V_{ref}$ is equal to the gate potentials of these transistors, which is found to provide a suitable choice for the reference potential $V_{ref}$ in the circuit shown in this Figure. As compared with the circuit shown in FIG. 2, both the input potential $V_{31}$ at the input 31 of the current mirror 29 and the reference potential $V_{ref}$ are decreased by one gate-source voltage in the circuit shown in FIG. 3. As a further distinction from the circuit shown in FIG. 2, the portion of the current mirror 29 comprising the transistors T1 and T2 is formed as "double twins" in order that the output current $I_o$ follows the input current $I_{in}$ more accurately as long as the current I3 through the transistor T3 is smaller than the reference current $I_{ref}$. In this case the drain of the transistor T1 is connected to the source of a transistor T6 whose drain is connected to its gate and to the input 1. Moreover, the drain of the transistor T2 is connected to the source of a transistor T7 whose drain is connected to the output 2 and whose gate is connected to the gate of the transistor T6. A Wilson mirror is which the gates of the transistors T1 and T2 are connected to the drain of the transistor T2 instead of to the drain of the transistor T1 is alternatively possible.

It will be evident that the circuits shown in FIGS. 2 and 3 with unipolar transistors may alternatively complete bipolar transistors. The drain of the transistor T4 may be connected to the positive power supply terminal, for example, via a diode. It is alternatively possible to replace the input transistor T1 of the current mirror by a resistor, resulting in $I'_{ref}$ and $I''_{ref}$ being no longer equal to $I_{ref}$. Resistors enhancing the equality of the currents I1 and I2 may be arranged between the sources (or emitters) of the transistors T1, T2 and T3 and the common terminal 39 of the current mirror 29 which is connected to the positive power supply terminal. To enhance the equality of the currents I1 and I3, the drain of the transistor T3 may be connected to the further output 35 of the current mirror circuit 19 via an extra transistor in the circuit according to FIG. 3. The drain of the extra transistor, which may be a p-type field effect transistor, is connected to the further output 35, the gate of the extra transistor is connected to the gates of the transistors T6 and T7 and the source of the extra transistor is connected to the drain of the transistor T3. The reference voltage $V_{ref}$ may also be generated by means of a resistor arranged between the positive power supply terminal and the gate of the transistor T5, through which resistor a fixed current flows which is determined by a current source connected to the resistor and the gate of the transistor T5. If desired, the transistor T6 in FIG. 3 may be replaced by a through-connection of its three terminals. The decrease of the reference potential $V_{ref}$ by one gate-source voltage, achieved in FIG. 3 by connecting the reference voltage terminal 41 to the gates of the transistors T1, T2 and T3, may alternatively be achieved by connecting the reference voltage terminal 41 to the drain of the transistor T5, the reference voltage terminal 41 being connected to the positive power supply voltage via a further transistor whose drain (collector) is connected to the gate (base). This further transistor may be either unipolar or bipolar. If the further transistor is unipolar, it may be of the n or p-type. Many other variations of the circuits shown can be conceived without passing beyond the scope of the invention. A preferred application of the current mirror circuit according to the invention in a video output amplifier circuit has been described hereinbefore. However, the circuit according to invention may also be used as a maximum current protection for an output amplifier in which the transistor T2 may be a power transistor in an output stage.

What is claimed is:

1. A current mirror circuit being provided with a current mirror, an input and an output of which are coupled to an input and an output, respectively, of the current mirror circuit, and a limiter circuit comprising a reference current source and a unilaterally conducting element which includes a transistor, a source electrode of which is coupled to the input of the current mirror circuit, characterized in that a control electrode of the transistor is coupled to the reference current source, to a further output of the current mirror and to a reference voltage terminal via a further unilaterally conducting element, and in that a drain electrode of the transistor is coupled to a power supply terminal.

2. A current mirror circuit as claimed in claim 1, characterized in that the current mirror comprises a first, a second and a third transistor whose source electrodes are coupled to each other, and whose control electrodes are coupled to each other, the control electrode of the first transistor being coupled to its drain electrode and the reference voltage terminal being connected to the source electrodes.

3. A current mirror circuit as claimed in claim 1, characterized in that the current mirror comprises a first, a second and a third transistor whose source electrodes are coupled to each other, and whose control electrodes are coupled to each other, the reference voltage terminal being coupled to said control electrodes, a drain electrode of the second transistor being coupled to the output of the current mirror via a further transistor and a drain electrode of the third transistor being coupled to the further output of the current mirror, a source electrode of said further transistor being coupled to the drain electrode of the second transistor and a drain electrode being coupled to the output of the current mirror.

4. A current mirror circuit as claimed in claim 3, characterized in that a drain electrode of the first transistor is coupled to the input of the current mirror via a second further transistor, the drain electrode of the first transistor being coupled to a source electrode of the second further transistor, a drain electrode of which is coupled to the input of the current mirror, and to a control electrode of the further transistor.

5. A current mirror circuit as claimed in any one of the preceding claims, characterized in that the further unilaterally conducting element comprises a transistor, a control electrode of which is coupled to the reference voltage terminal and a source electrode is coupled to the control electrode of the transistor in the first-mentioned unilaterally conducting element.

6. A video output amplifier circuit comprising a complementary source electrode follower output stage constituted by a first and a second output transistor, a drain electrode of the first output transistor being coupled to an input of a first current mirror circuit and a drain electrode of the second output transistor being provided with a beam current measuring point and being coupled to an output of a second current mirror circuit, and input of said second current mirror circuit being coupled to an output of the first current mirror circuit, the first current mirror, circuit being provided with a current mirror an input and an output of which are coupled to the input and the output, respectively, of the first current mirror circuit, and a limiter circuit comprising a reference current source and a unilaterally conducting element which includes a transistor, a source electrode of which is coupled to the input of the first current mirror circuit, characterized in that a control electrode of the transistor is coupled to the reference current source, to a further output of the current mirror and to a reference voltage terminal via a further unilaterally conducting element, and in that a drain electrode of the transistor is coupled to a power supply terminal.

7. A current mirror circuit being provided with a current mirror and input and an output of which are coupled to an input and an output, respectively, of the current mirror circuit, and a limiter circuit comprising a reference current source and a unilaterally conducting element which includes a transistor, an emitter electrode of which is coupled to the input of the current mirror circuit, characterized in that a control electrode of the transistor is coupled to the reference current source, to a further output of the current mirror and to a reference voltage terminal via a further unilaterally conducting element, and in that a collector electrode of the transistor is coupled to a power supply terminal.

8. A current mirror circuit as claimed in claim 7, characterized in that the current mirror comprises a first, a second and a third transistor whose emitter electrodes are coupled to each other, and whose control electrodes are coupled to each other, the control electrode of the first transistor being coupled to its collector electrode and the reference voltage terminal being connected to the said emitter electrodes.

9. A current mirror circuit as claimed in claim 7, characterized in that the current mirror comprises a first, a second and a third transistor whose emitter electrodes are coupled to each other, and whose control electrodes are coupled to each other, the reference voltage terminal being coupled to said control electrodes, a collector electrode of the second transistor being coupled to the output of the current mirror via a further transistor and a collector electrode of the third transistor being coupled to the further output of the current mirror, an emitter electrode of said further transistor being coupled to the collector electrode of the second transistor and a collector electrode being coupled to the output of the current mirror.

10. A current mirror circuit as claimed in claim 9, characterized in that a collector electrode of the first transistor is coupled to the input of the current mirror via a second further transistor, the collector electrode of the first transistor being coupled to an emitter electrode of the second further transistor, a collector electrode of which is coupled to the input of the current mirror, and to a control electrode of the further transistor.

11. A current mirror circuit as claimed in any one of claims 7-10, characterized in that the further unilaterally conducting element comprises a transistor, a control electrode of which is coupled to the reference voltage terminal and an emitter electrode is coupled to the control electrode of the transistor in the first-mentioned unilaterally conducting element.

12. A video output amplifier circuit comprising a complementary emitter electrode follower output stage constituted by a first and a second output transistor, a collector electrode of the first output transistor being coupled to an input of a first current mirror circuit and a collector electrode of the second output transistor being provided with a beam current measuring point and being coupled to an output of a second current mirror circuit, an input of said second current mirror circuit being coupled to an output of the first current mirror circuit, the first current mirror circuit being provided with a current mirror, an input and an output of which are coupled to the input and the output, respectively, of the first current mirror circuit, and a limiter circuit comprising a reference current source and a unilaterally conducting element which includes a transistor, an emitter electrode of which is coupled to the input of the first current mirror circuit, characterized in that a control electrode of the transistor is coupled to the reference current source, to a further output of the current mirror and to a reference voltage terminal via a further unilaterally conducting element, and in that a collector electrode of the transistor is coupled to a power supply terminal.

* * * * *